US011093661B2

(12) United States Patent
Amadon et al.

(10) Patent No.: US 11,093,661 B2
(45) Date of Patent: Aug. 17, 2021

(54) SMART RELATIONS OF COMPUTER AIDED DESIGN (CAD) COMPONENTS

(71) Applicant: PTC Inc., Boston, MA (US)

(72) Inventors: Gary Amadon, West Townsend, MA (US); Parapura Rajkumar, Acton, MA (US); Malay Kumar, Acton, MA (US)

(73) Assignee: PTC Inc., Boston, MA (US)

( * ) Notice: Subject to any disclaimer, the term of this patent is extended or adjusted under 35 U.S.C. 154(b) by 349 days.

(21) Appl. No.: 16/050,558

(22) Filed: Jul. 31, 2018

(65) Prior Publication Data

US 2019/0042667 A1     Feb. 7, 2019

Related U.S. Application Data

(60) Provisional application No. 62/539,693, filed on Aug. 1, 2017.

(51) Int. Cl.
*G06F 30/00*     (2020.01)
*G06N 20/00*     (2019.01)
(Continued)

(52) U.S. Cl.
CPC ............ *G06F 30/00* (2020.01); *G06N 20/00* (2019.01); *G06T 19/20* (2013.01);
(Continued)

(58) Field of Classification Search
CPC .. G06F 30/00; G06F 2111/02; G06F 2111/20; G06N 20/00; G06T 19/20; G06T 2219/2004
See application file for complete search history.

(56) References Cited

U.S. PATENT DOCUMENTS 6,417,865 B1    7/2002   Bou
7,657,455 B2    2/2010   Sachdev et al.
(Continued)

OTHER PUBLICATIONS

Foucault et al. "Enriching Assembly CAD Models With Functional and Mechanical Informations To Ease CAE". Proceedings of the ASME 2010 International Design Engineering Technical Conferences & Computers and Information in Engineering Conference. Aug. 15-18, 2010. 11 Pages. (Year: 2010).*
(Continued)

*Primary Examiner* — Eunhee Kim
(74) *Attorney, Agent, or Firm* — Clocktower Law; Erik J. Heels; Michael A. Bartley

(57) ABSTRACT

In most of today's computer aided design (CAD), there are many definitive relationship between how components used in a CAD design relate to other components and feature in the same design. These relationships include sizing (a component is sized based upon another component), placement and orientation (a component is position and orientated based upon another component or feature). In addition, certain components can only be used with other specific components within the same design. Various attributes are placed on the CAD components and features that relate to each other that will be used to automatically size, place and orientate components, as well as make sure the component is valid to be used within the design intent. This saves designers considerable amount of design time as well as ensuring accurate component to component relationship as used in their design.

15 Claims, 12 Drawing Sheets

(51) Int. Cl.
G06T 19/20 (2011.01)
G06F 111/02 (2020.01)
G06F 111/20 (2020.01)

(52) U.S. Cl.
CPC ....... *G06F 2111/02* (2020.01); *G06F 2111/20* (2020.01); *G06T 2219/2004* (2013.01)

(56) References Cited

U.S. PATENT DOCUMENTS

| | | |
|---|---|---|
| 7,856,342 B1 | 12/2010 | Kfouri et al. |
| 8,392,150 B2 | 3/2013 | Mujtaba et al. |
| 8,645,107 B2 | 2/2014 | Gibson et al. |
| 8,762,941 B2 | 6/2014 | Loberg |
| 9,189,571 B2 | 11/2015 | Loberg |
| 2002/0107673 A1* | 8/2002 | Haller ................... G06T 19/20 703/1 |
| 2007/0168923 A1 | 7/2007 | Connor et al. |
| 2008/0162075 A1 | 7/2008 | Hamazoe |
| 2014/0214368 A1* | 7/2014 | Loberg ................... G06F 30/13 703/1 |
| 2014/0379309 A1 | 12/2014 | Banta et al. |
| 2015/0269282 A1 | 9/2015 | Nelaturi et al. |
| 2015/0356209 A1* | 12/2015 | Han ........................ G06T 19/20 703/1 |
| 2016/0042097 A1* | 2/2016 | Briggs ................... G06F 30/00 703/1 |
| 2016/0232260 A1 | 8/2016 | Kanatani et al. |
| 2016/0246899 A1* | 8/2016 | Hirschtick .............. G06F 30/17 |
| 2017/0169135 A1* | 6/2017 | Kumar ..................... G06T 7/60 |

OTHER PUBLICATIONS

Wu et al. "Towards a Cloud-Based Design and Manufacturing Paradigm: Looking Backward, Looking Forward". Proceedings of the ASME 2012 International Design Engineering Technical Conferences & Computers and Information in Engineering Conference. Aug. 12-15, 2012. 14 Pages. (Year: 2012).*

* cited by examiner

Ansi Bolt

Features (10)

*Filter by name or type*  32

- Right
- Sketch 1
- Extrude 1
- Sketch 2
- Extrude 2
- Chamfer 1
- Chamfer 2

Parts (1)

Ansi Inch B18.2 Hex Bolt

| | DIAMETER | HEAD HEIGHT | HEX SIZE |
|---|---|---|---|
| 1/4 | 0.25 | 0.188 | 0.438 |
| 1/2 | 0.5 | 0.364 | 0.75 |
| 3/4 | 0.75 | 0.524 | 1.125 |

FIG. 3

SMART RELATIONS OF COMPUTER AIDED DESIGN (CAD) COMPONENTS

CROSS-REFERENCE TO RELATED APPLICATIONS

This utility patent application claims priority from U.S. provisional patent application Ser. No. 62/539,693, filed Aug. 1, 2017, titled "Smart Relations of Computer Aided Design (CAD) Components" and naming inventors Gary Amadon, Parapura Rajkumar, and Malay Kumar.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright 2018, Onshape Inc.

BACKGROUND

Field of Technology

This relates to computer software for computer aided design, and more particularly to computer aided design software for establishing automatic relations and properties between design elements.

Background

Computer aided design (CAD) software is used to construct 'models' of components used in various mechanical design environments. In many CAD software products, these component models are stored locally on a single computer or company networked environment, significantly limiting any access to them for collaboration and sharing purposes.

In addition, within the majority of CAD designs, many components are used that relate to other components and features and are meant to be used together in a particular manner. For example, one of the most common scenarios of this is a hole feature (a CAD 'feature') that is designed for and meant to be for a fixed type and size of bolt (the component). During the assembly process of the CAD design, the user must go through every individual step of selection the correct type, sizing and assembling the bolt into the existing hole, there's is no automated process of this. In addition, the user might not even know what component or feature is designed to be specifically or most commonly used with another component.

In existing CAD programs, the design relationship is not present for components and features that are meant to be used together in a particular manner. End users must go through every step of any 'component to component' or 'component to feature' relationship every time it is needed, which becomes very time consuming and tedious. These steps include:

- An end user researches and determines what component is designed to be used with other components or features needed within their own CAD design.
- The end user manually selects the correct properties of the components or features every time the component or feature is needed in their designs.
- The end user manually assembles the 'component to component' or 'component to feature' relationship every time required in their designs.

Description of Prior Art

U.S. Pat. No. 9,189,571 ("AUTOMATED RE-USE OF STRUCTURAL COMPONENTS, Loberg, Nov. 17, 2015) discloses, in the Abstract, "Systems, methods, and apparatus allow for easy and efficient structural design and/or reconfiguration while using existing stock components. One or more implementations allow a designer to import a stock file containing an inventory of stock components that are usable as part of a structural design. In particular, one or more implementations allow the stock components to be used in a structural design while tracking, in real-time, the availability of stock components. Furthermore, one or more implementations automatically correlate stock components with existing components of a structural design or with new components as a designer inserts them into the structural design. Additionally, one or more implementations visually distinguish between new components in the structural design and stock components in the structural design. Furthermore, one or more implementations auto-select or modify surrounding components in the structural design to match an inserted stock component." This focuses on stock structural components.

U.S. Pat. No. 8,645,107 ("AUTOMATIC COMPONENT INSERTION AND CONSTRAINT BASED UPON PREVIOUS_USE DATA", Gibson and Li, Feb. 4, 2014) discloses, in the Abstract, "Automatically adding constraints between entities in a subject computer-aided design (CAD) model of a real-world object includes storing information regarding CAD model entities and related constraints in a computer database in which the CAD model entities belong to one or more components of the subject CAD model or other CAD models. The computer database is accessed to determine previously used constraints for at least one entity of a given component being added to the CAD model, and constraints are automatically added between at least one entity of the given component and another entity in the subject CAD model based on the previously used constraints." This solution adds constraints between entities in a CAD model based upon previously used constraints. However, this solution does not work if relationships between CAD based components are not easily defined based upon entity relationship.

U.S. Pat. No. 7,079,990 ("AUTOMATED CONNECTIONS OF COMPUTER_AIDED DESIGNED COMPONENTS", Haller et al., Jul. 18, 2006) discloses, in the Abstract, "Construction of a model using a computer aided design system includes constructing a feature in a three dimensional model based on data input by a user. Following construction of the feature, a part configured to compatibly couple with the feature is automatically identified based on design attributes of the feature. The part can be selected from a parts library that includes data representing parts and their geometric characteristics. The part also may be automatically generated based on a part model in a parts library. The part generation can include querying a database storing the part library to retrieve a part model, and then generating an instance of the part model based on design attributes of the feature so as to ensure coupling compatibility with the feature." This solution automates connection of CAD components based upon defined attributes on those components within a limited, single-user desktop environment.

U.S. Pat. No. 8,392,150 ("Smart content and placement in a computer-aided design application", Mujtaba et al., Mar. 5, 2013) discloses, in the Abstract, "A method, apparatus, and article of manufacture provide the ability to manipulate a graphical representation of a real-world object in a computer drawing application. A semantic behavior is defined for the real-world object. A graphical representation of the real-world object (referred to as a subject object) is obtained. The semantic behavior is assigned to the subject object. The subject object is placed into a drawing. When placed, the subject object automatically, without additional user input, places itself into the drawing based on the semantic behavior." This solution places smart content within a drawing, but does not address automatic relations between existing CAD design elements.

One implementation for multi-user cloud-based 3-D parametric CAD is the Onshape CAD system described in patent application 2016/0246899 ("MULTI-USER CLOUD PARAMETRIC FEATURE-BASED 3D CAD SYSTEM", Hirschtick et al., 2016 Aug. 15), which is hereby fully incorporated by reference. The Onshape CAD system includes an internet 'cloud' based storage mechanism which allows collaboration, sharing and usage access amongst users anywhere in the world.

None of the above provides a multi-user cloud-based CAD system with configurable or learnable smart properties on components which may automate sizing, orientation, and connection of components created by other users. What is needed, therefore, is a system that overcomes the above-mentioned limitations and that includes the features enumerated above.

BRIEF SUMMARY

This invention allows CAD components (also referred to as content) or features to be designed in a manner that allows 'smart' properties (also referred to as attributes) to be defined on the component or feature so that they can be used to create 'smart' mechanical relations and connections with other components and features designed in the same fashion. In addition these 'smart' properties and subsequent smart relations and connections allow the creation of a 'smart' analysis, in which commonly used combinations of components and features designed in this manner are known, allowing predetermination of what components are specifically to be used or are most commonly used with other components and features.

An enhancement to the Onshape system or similar cloud-based multi-user CAD systems is an automated process of selecting a correct component or feature based on a related first component or feature, and then automating the sizing and assembling of the two components or features. This solution allows CAD components (also referred to as content) or features to be designed in a manner that allows 'smart' properties (also referred to as attributes or metadata) to be defined on the component or feature and stored in a cloud environment so that they can be used to create 'smart' mechanical relations and connections with other components and features designed in the same fashion.

A CAD component can be defined that contains globally accessible smart properties that dictate how that component is sized and how its size relates to other sizes of other components and features. These properties have values that identify a particular configuration of the component. For example, a CAD component such as a 'Hex Bolt' might be inserted into a design having a 'hole' feature, and smart properties automatically select a configuration sizing the 'Hex Bolt' component based on the 'hole' feature.

Users can initiate a CAD program action in a which smart property to property value match is executed between multiple components and/or features to determine a smart relation size match. For example, a washer component may be automatically sized to a bolt component it is assembled to. As another example, a bolt component may automatically size to a hole feature the bolt is being positioned into.

Precondition properties can also be added to a CAD component that dictate required components or features that the component specifically relates to. For example, a metric bolt can be restricted to be used only with other metric components or features. As another example, a pulley available via a supplier may be restricted for use only with motors available via the same supplier. If precondition properties exist for a first component, only the related components or features that meet the preconditions can be used with the first component in assembly related operations.

All smart properties and their values may be stored in cloud-accessible storage, such as a database, with a multi-user CAD system. Using this stored information, commonly used combinations may be identified and presented to the end user to aid and automate their selection process of the correct component and features to use in their design as needed. If a user desires to use a first component that has defined preconditions, only related components or features that meet the preconditions may be used with the first component.

In addition, a CAD component or feature can be defined that contains a smart 'Mate Connector' which can be used to dictate how a component is positioned to other components and features. A mate connector is an entity put on components and features to represent local coordinate systems. Mate connectors locate and orientate components and features to other components and features that also have mate connectors defined on them. Strategically defining smart mate connectors at locations on components and features where other components and features are meant to connect or interact when assembled allows automatic assembling.

An example of using smart mate connectors may be as follows. A component may exist with a positioned smart mate connector which contains properties that identifies how other components can assemble to the component at the smart mate connector. A second component may also have a smart mate connector defined in the same manner. If the two components relate (i.e., the property definitions define a valid assemble condition between the two components), the mate connector functionality in regards to positioning two mate connectors allows smart assembly of the two components. That is, the components will assemble in the exact way they are designed to be assembled. An example of this may include a concept called 'stacking', that is one component correctly positioned on top of another. Stacking is common in the use of fastening content, such as correctly positioning a 'nut' on top of a 'washer', or positioning a 'washer' correctly under the head of a 'bolt'. Another example may include automatic positioning of a 'pulley' component on the shaft of a 'motor' component.

Another example of using smart mate connectors may be as follows. A component may exist with a positioned smart mate connector which contains properties that identifies what other components can assemble to the component at the smart mate connector. In addition, the component may have a smart property to determine its size in relation to other components and features. A feature may exist (for example a 'hole' feature) that also has a smart mate connector defined on it. Feature mate connectors, similar to mate connectors defined on a component, are defined on a feature in a location that is its assembly location and contain properties of what can be assembled at the feature. The two can be automatically assembled when an end user makes an assemble request between the two. An example may be putting a 'bolt' component into a 'hole' feature. By using a smart mate connector, the bolt may be automatically sized, positioned, and orientated correctly in the hole.

In addition, these 'smart' properties and subsequent smart relations and connections allow the creation of a 'smart' analysis, in which commonly used combinations of components and features designed in this manner are known, allowing predetermination of what components are specifically to be used or are most commonly used with other components and features. When a CAD component is mated to another CAD component or feature, a smart analysis can be created which stores the relationship of that CAD component to the other CAD component or feature. For example, a bolt of type 'ANSI Inch Hex Bolt' may be positioned into a CAD hole feature type 'ANSI Inch Counterbored Hole'; the exact positioning may be done using a mate type called 'Fastened', which always keeps the bolt of type 'ANSI Inch Hex Bolt' correctly orientated and located in the hole of type 'ANSI Inch Counterbored Hole' throughout the user's CAD design process. A smart analysis can be created with information. Whenever a CAD mate design of this intent is created, a smart analysis record may be created in the cloud database. This smart analysis record consists of an entry that uniquely identifies the CAD component that references other CAD components and features, the reference relationship type to those other components and features, and the list of the other CAD components and features that the reference component relates to by the reference relationship type. Thus, in this example, the smart analysis entry can be defined as "CAD component of type 'ANSI Inch Hex Bolt' is 'fastened' to hole feature of type 'ANSI Inch Counterbored Hole'." As additional mate references are done in other CAD designs using the same reference CAD component, the existing smart analysis entry in the cloud database is updated. For example, say a CAD component of type 'ANSI Inch Flat Washer' is fastened mated to the same bolt of type 'ANSI Inch Hex Bolt'. The smart analysis record may be updated to include the relationship to the 'ANSI Inch Flat Washer', so now the smart analysis entry can be defined as "CAD component of type 'ANSI Inch Hex Bolt' is 'fastened' to (1) hole feature of type 'ANSI Inch Counterbored Hole' and (2) CAD component 'ANSI Inch Flat Washer'." The cloud database can then be queried to retrieve and display all the smart analysis for CAD component 'ANSI Inch Hex Bolt'.

BRIEF DESCRIPTION OF THE DRAWINGS

In the drawings, closely related figures and items have the same number but different alphabetic suffixes. Processes, states, statuses, and databases are named for their respective functions.

FIG. 3 shows, within the CAD program interface, adding smart relation sizing properties and values to the completed CAD component of FIG. 2.

DETAILED DESCRIPTION, INCLUDING THE PREFERRED EMBODIMENT

In the following detailed description, reference is made to the accompanying drawings which form a part hereof, and in which are shown, by way of illustration, specific embodiments which may be practiced. It is to be understood that other embodiments may be used, and structural changes may be made without departing from the scope of the present disclosure.

Terminology

The terminology and definitions of the prior art are not necessarily consistent with the terminology and definitions of the current disclosure. Where there is a conflict, the following definitions apply.

mate connector—local coordinate system entities located on or between parts and used within a mate to locate and orient instances with respect to each other.

feature—one or more parametric geometric operations having configurable rules or properties which apply to sketches, parts, assemblies, or other features to produce or modify 3D geometry. Examples of features within a CAD design may include, but are not limited to, holes as well as extruded, revolved, swept, or lofted surfaces.

sketch—a collection of 2D geometry and constraints, on a plane model—the 3D geometry that is the result of the geometric operations mate—a high-level entity used to position instances and define how the instances move (e.g., define movement between parts and/or sub-assemblies)

Smart properties are pre-configured (or learned by the CAD system) properties in particular configurations such that selecting a configuration for a part having smart properties automatically adjusts the properties of the part to the pre-configured (or learned) values of that particular configuration.

Smart connectors are pre-configured (or learned by the CAD system) mate connectors defining orientation, positioning, and type and/or degree of movement for a design connecting a mate connector or feature of a different part or sub-assembly.

Operation

Figure 1:
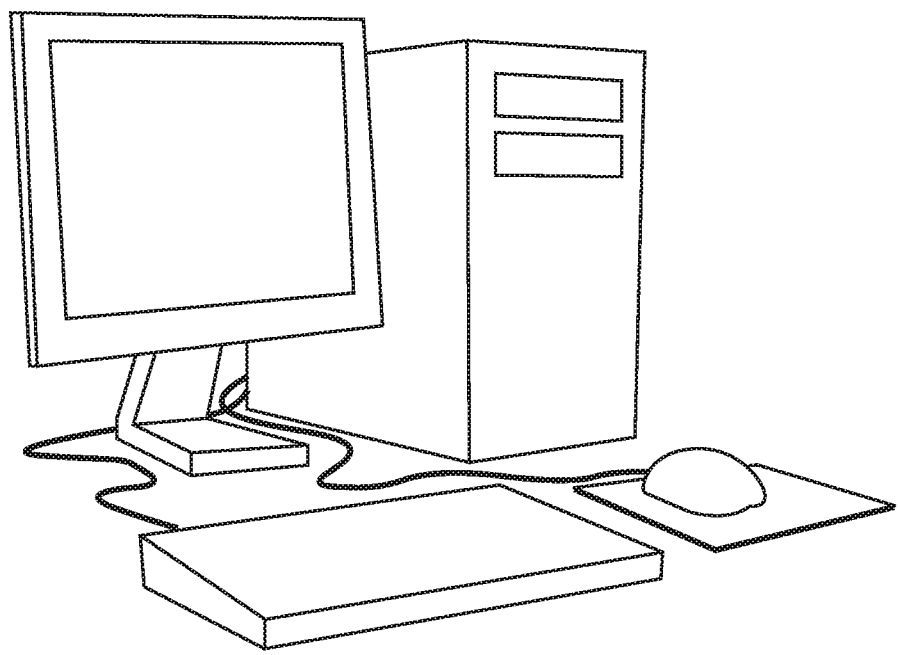
FIG. 1 illustrates the components of a computer system typically used for CAD design.

Referring to FIG. 1, a computer system for CAD modeling may include a CPU, a keyboard input device, mouse or similar input device such as a trackpad or touchscreen, and a display screen. System software may include any modern system operating system such as Apple OS or Microsoft Windows. Software may also include an internet web browser, such as Google Chrome or Safari, or dedicated application for displaying and interacting with CAD modeling.

Via the internet web browser or dedicated application, users may initiate cloud based CAD design software. The cloud-based software operates on one or more server computers, which may be virtualized within cloud service implementations. The CAD design software allows creation of component models and features, and storage of those component models and features in a cloud infrastructure database, which also allows access to other CAD component models of other users.

Once a CAD design is complete, the CAD system may convert the CAD design into manufacturing directives and the design produced as a physical item by a CNC (computer numerical control) machine. Smart sizing, orientation, and connection of parts within designs may greatly improve existing design processes and aid the entire process of computer design and production.

Figure 2:
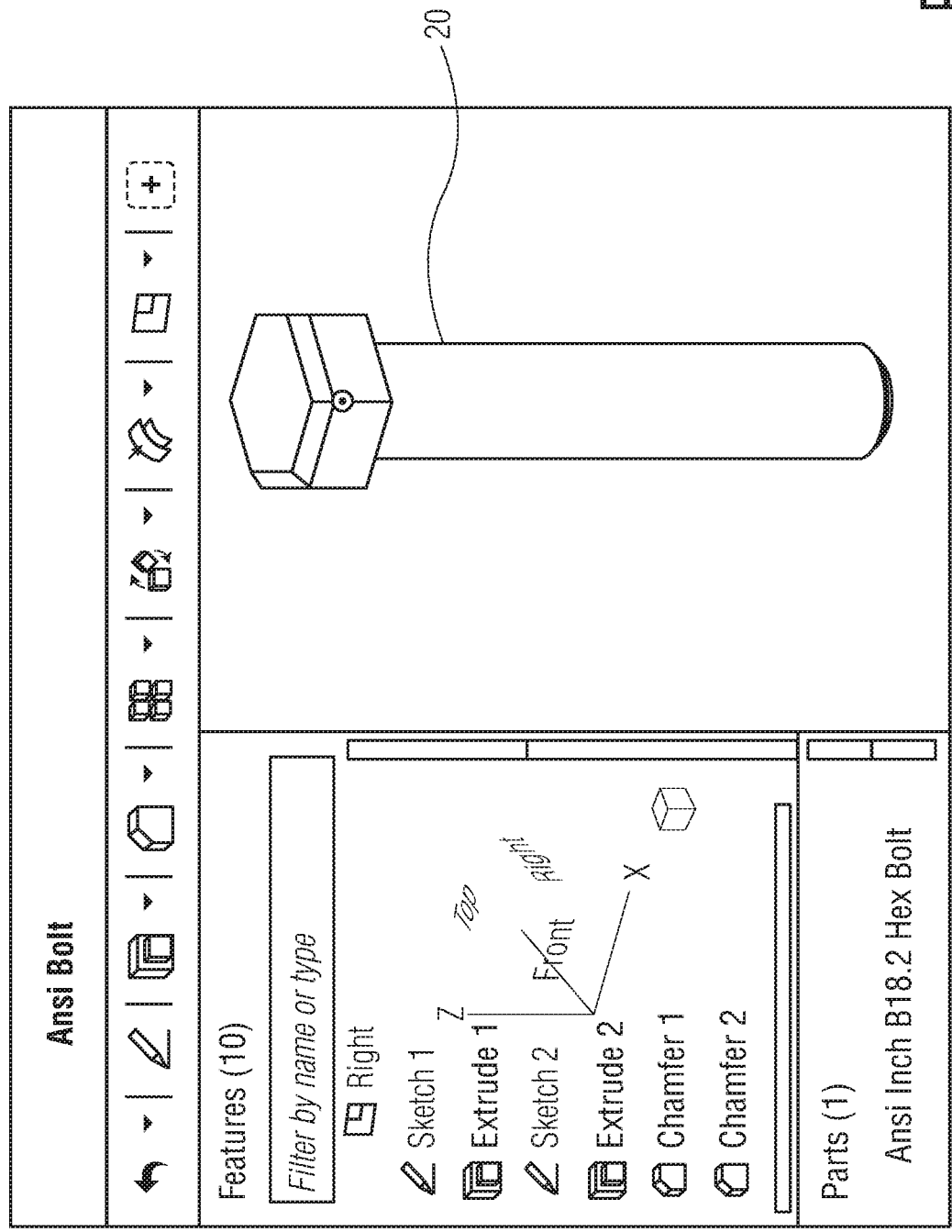
FIG. 2 shows an Onshape CAD program interface with a completed CAD component model design.

Referring also to FIG. 2, a CAD design engineer may author a CAD component model #1 20. The component is first geometrically modeled using CAD modeling tools provided within the CAD design software. A typical process may include sketching profiles, accurately dimensioning the sketch, and then making 3D parts from the sketch, using typical CAD modeling tools such as, but not limited to, Extrude, Revolve, Sweep, or Loft.

Referring also to FIG. 3, the CAD designer may add smart properties 30 to the CAD component model #1. In designing a part, the designer can select any adjustable dimension or property, and label (or name) that property, through standard interface controls. In model #1, the designer has labeled "diameter," "head height", and "hex size" properties. Through standard interface controls, the designer may then select to add or edit smart properties, bringing up smart properties configuration 30. These smart properties identify specific sizes of different aspects of the component for different configurations of the model. For model #1, the designer has used size values 32 to define each selectable configuration. For every 'Size' value 32, corresponding geometric values 34 of the model are entered by the designer. Note that 'Size' is a label for different configurations as entered by the designer, with specific parameters of properties defined for the configuration which determine overall size of the component. Here the entered 'Size' values match with diameter, as the designer has chosen to enter 'Size' values corresponding to standard bolt identification.

Figure 4:
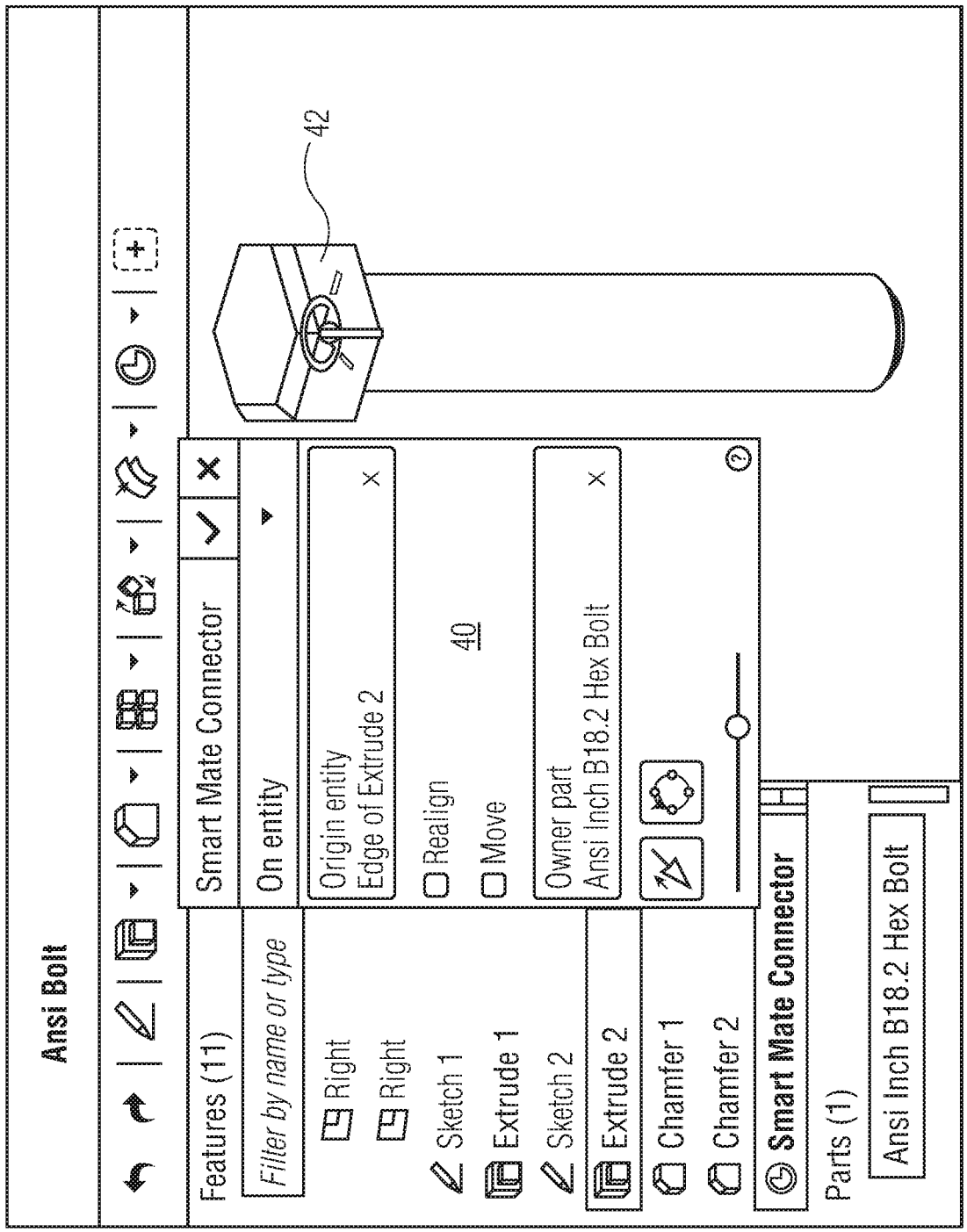
FIG. 4 shows, within the CAD program interface, adding a smart mate connector to the completed CAD component of FIG. 2.

Referring also to FIG. 4, the CAD designer may add a smart mate connector 40 at a corresponding feature insert position 42 on CAD component model #1. The smart mate connector defines an orientation for the component if fitted to any matching mate connector.

Figure 5:
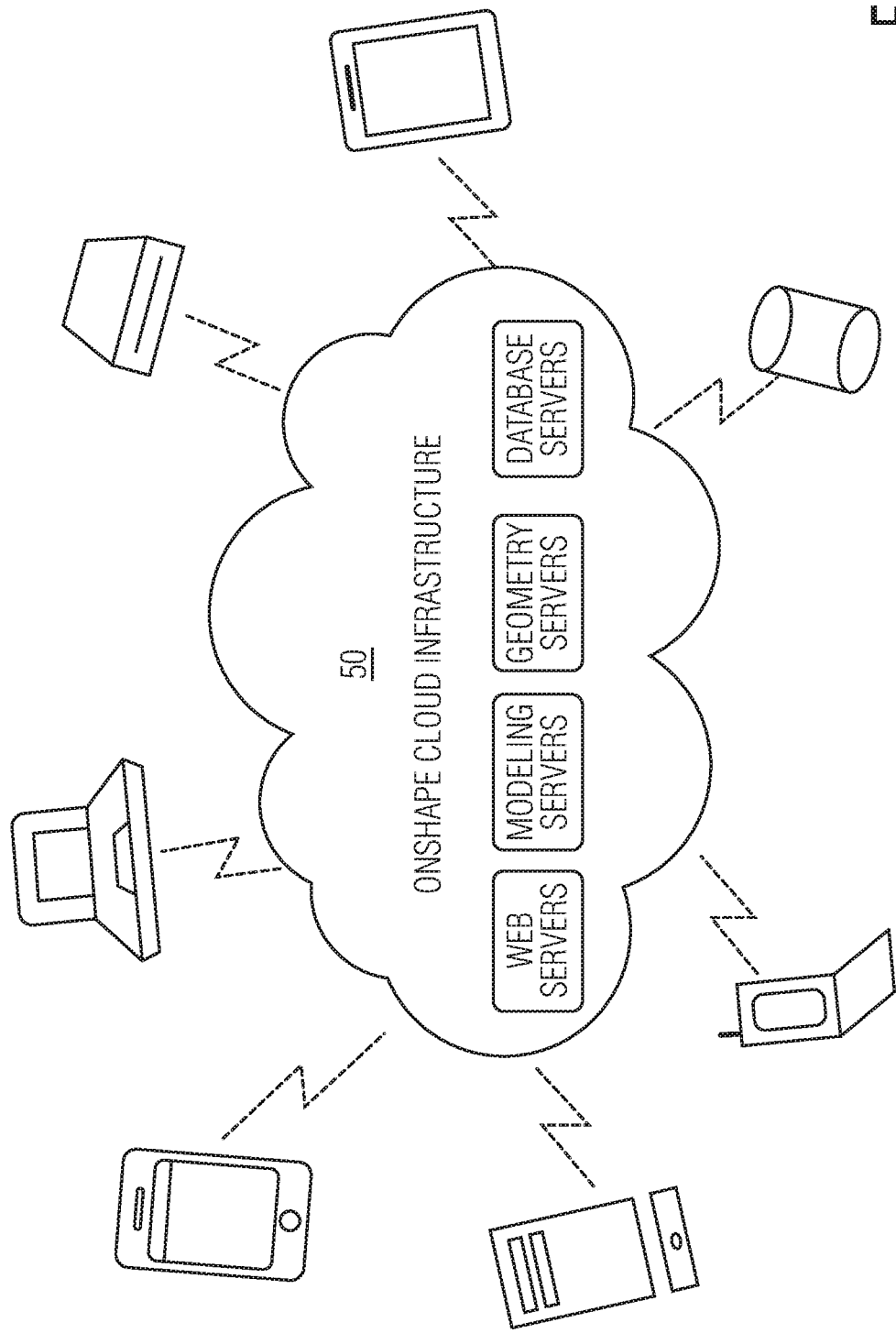
FIG. 5 illustrates a CAD software program connected cloud infrastructure.

Referring also to FIG. 5, the CAD designer completes the component authoring and component model #1 is automatically saved in the cloud infrastructure database 50. The smart properties, including different sizes of various configurations, and the smart mate connector, including orientation details for the component, and preconditions (discussed below) are stored along with the component. Since all models are stored in the cloud infrastructure database, the component model as authored by the CAD designer, including the smart properties and smart mate connector, can be shared and made accessible to all other CAD designers as needed.

Figure 6:
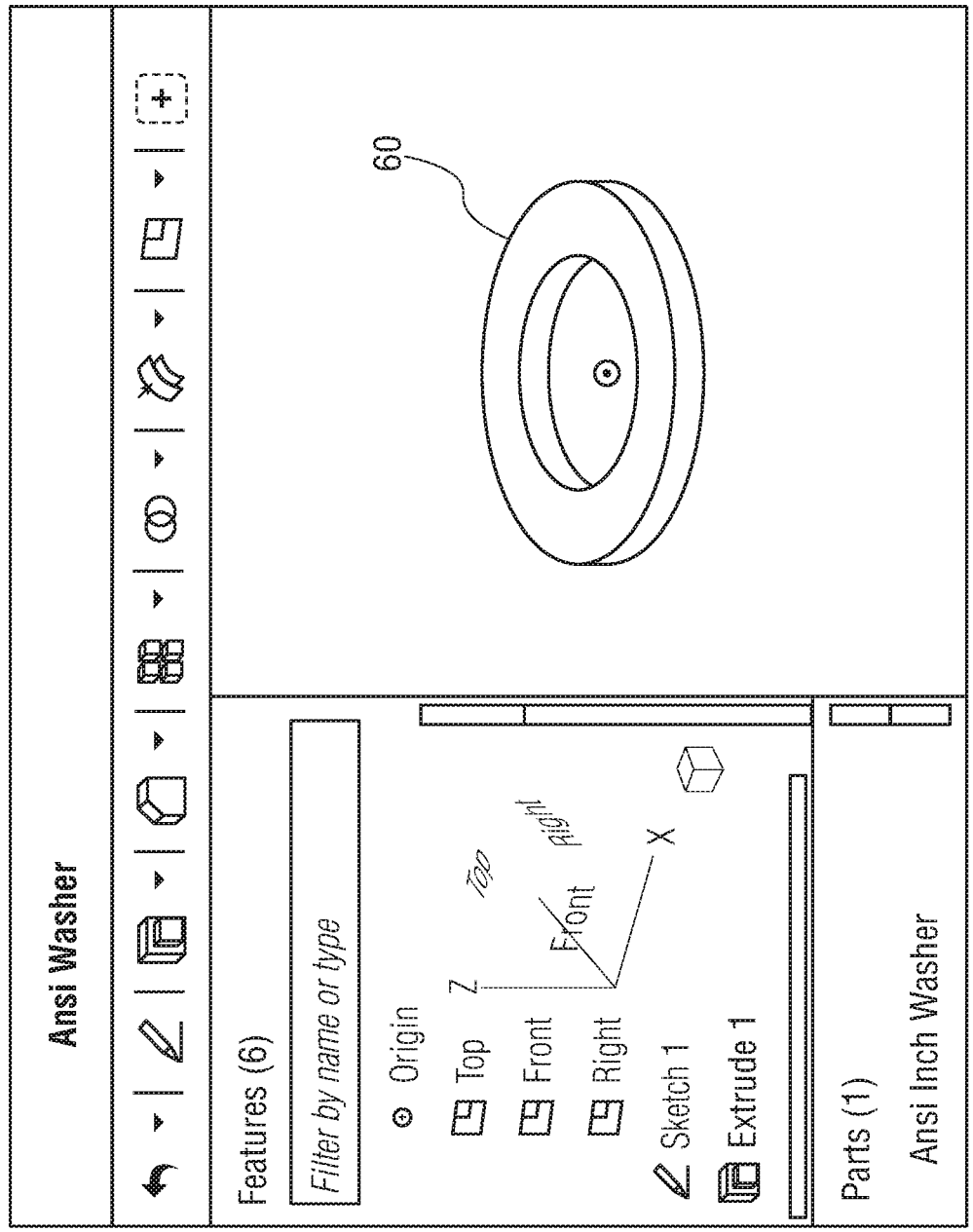
FIG. 6 shows an Onshape CAD program interface with a completed CAD component model design.

Referring also to FIG. 6, a CAD designer, which may be the same or a different designer from the designer of component model #1, may author component model #2 60. The component is first geometrically modeled using CAD modeling tools. A typical process may include sketching profiles, accurately dimensioning the sketch, and then making 3D parts from the sketch, using typical CAD modeling tools such as, but not limited to, Extrude, Revolve, Sweep, or Loft.

Figure 7:
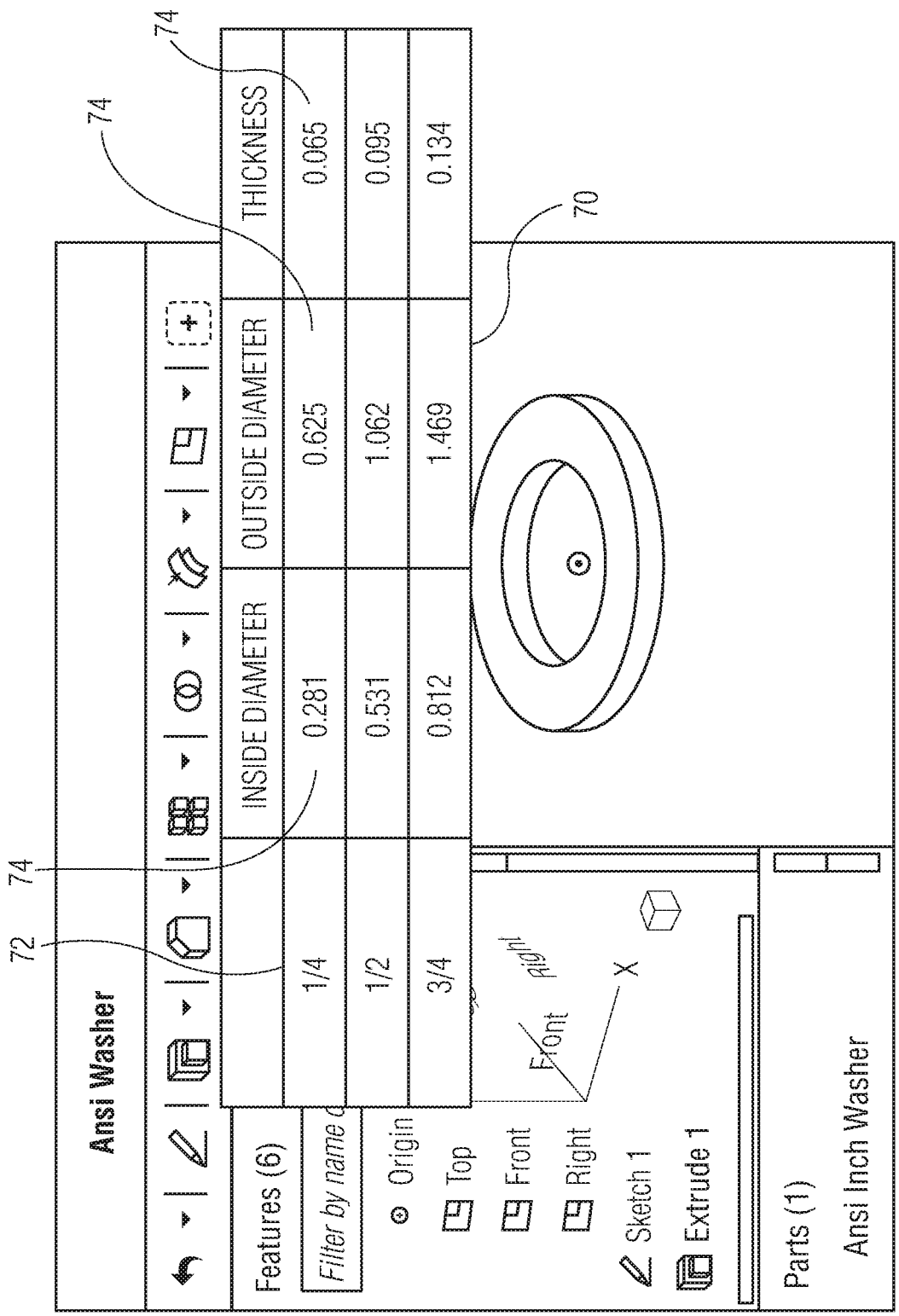
FIG. 7 shows, within the CAD program interface, adding the smart relation sizing properties and values to the completed CAD component of FIG. 6.

Referring also to FIG. 7, the CAD designer may add smart properties 70 to the CAD component model #2. These smart properties are created and configured as previously discussed. In this case, the CAD designer has labeled "inside diameter", "outside diameter", and "thickness" as smart properties of the part. These smart properties identify specific sizes of different aspects of the component for different configurations of the model. Once again, the designer has configured the properties for different sizes of the part. For every 'Size' value 72, the geometric values 74 of the model are entered by the designer. Note that 'Size' is a label for different configurations as entered by the designer, with specific parameters of properties defined for the configuration which determine overall size of the component. Here the designer has entered 'Size' values corresponding to conventional referencing, for example so that a "¼ Size" washer corresponds to washer dimensions which fit around a ¼ diameter bolt.

Figure 8:
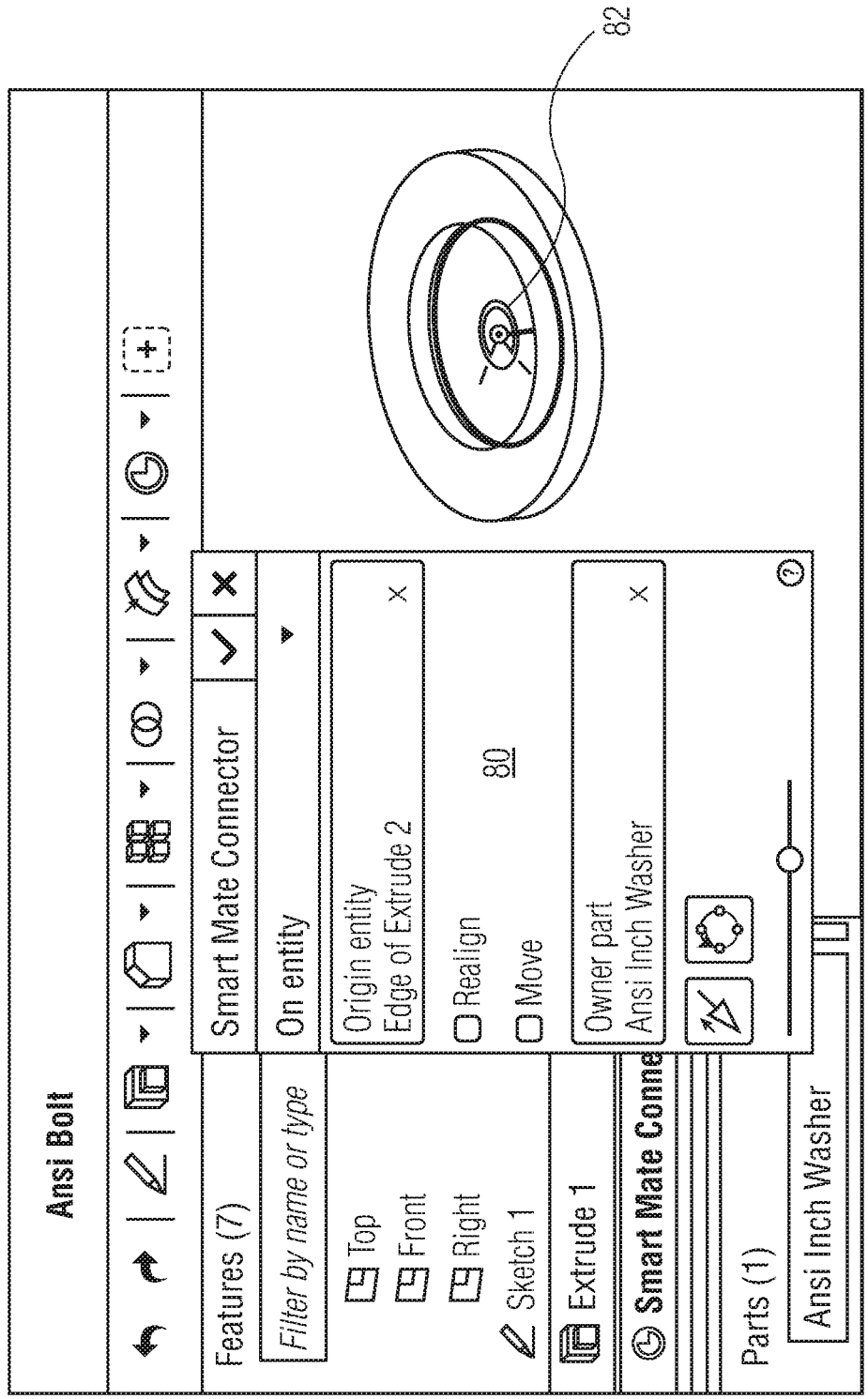
FIG. 8 shows, within the CAD program interface, adding a smart mate connector to the completed CAD component of FIG. 6.

Referring also to FIG. 8, the CAD designer may add a smart mate connector 80 at a corresponding feature insert position 82 on CAD component model #2. The smart mate connector defines an orientation for the component if fitted to any matching mate connector.

Figure 12:
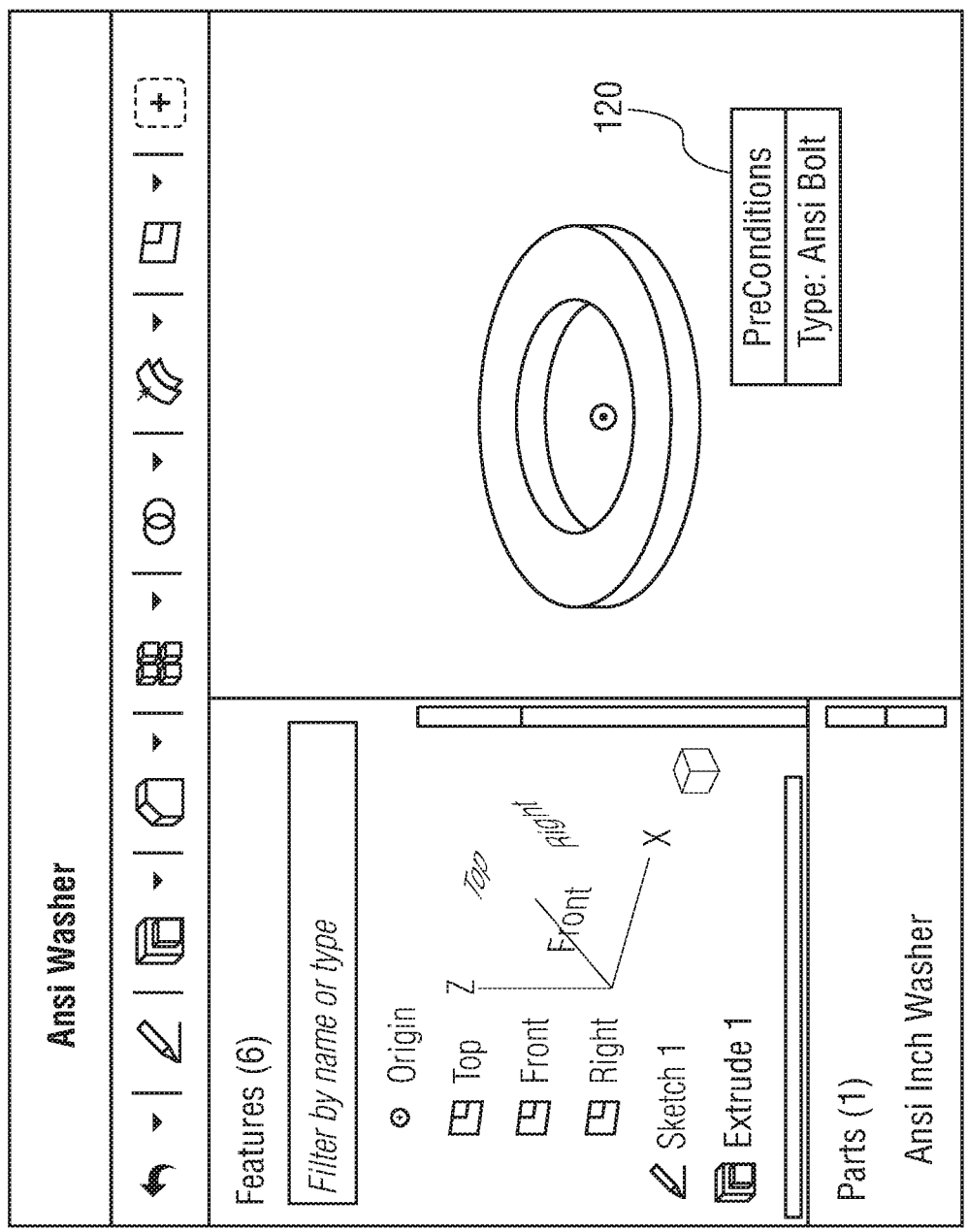
FIG. 12 shows, within an Onshape CAD program interface, adding a precondition clause to a CAD component.

Referring also to FIG. 12, the CAD designer may add, through standard interface controls, a precondition 50 onto a component model, such as component model #2, indicating it relates to a specific component type. The example shown is the restricting component model #2 to require the 'Ansi Bolt' component type. Any preconditions restrict a component to only be sized and positioned to the specific component type specified in the precondition. Preconditions may be defined based on "type" of components, with components having a "type" property which may be set as a text string and then matched to determine if preconditions are met.

When the CAD designer completes the component authoring and component model #2 is automatically saved in the cloud infrastructure database 50. The smart properties, including different sizes of various configurations, and the smart mate connector, including orientation details for the component, and preconditions are stored along with the component. Since all models are stored in the cloud infrastructure database, the component model as authored by the CAD designer, including the smart properties, smart connector, and preconditions, can be shared and accessible to all other CAD designers as needed.

In addition to smart property creation by a designer, smart properties can be learned by the CAD system. Every time a component is connected to another component or feature, details may be tracked in the CAD cloud database about such connection. Size aspects, orientation via mate connectors, and which specific components/features make up the connection are all types of details which may be tracked. System thresholds may be set based on total numbers (for example, if a component is used more than a specific number of times with a specific feature) and percentages (if greater than a certain percentage of times used with a specific feature, the sizes of the component are all the same, or oriented the same way). Once thresholds are met, smart properties and smart mate connectors may be learned by the CAD system.

Figure 9:
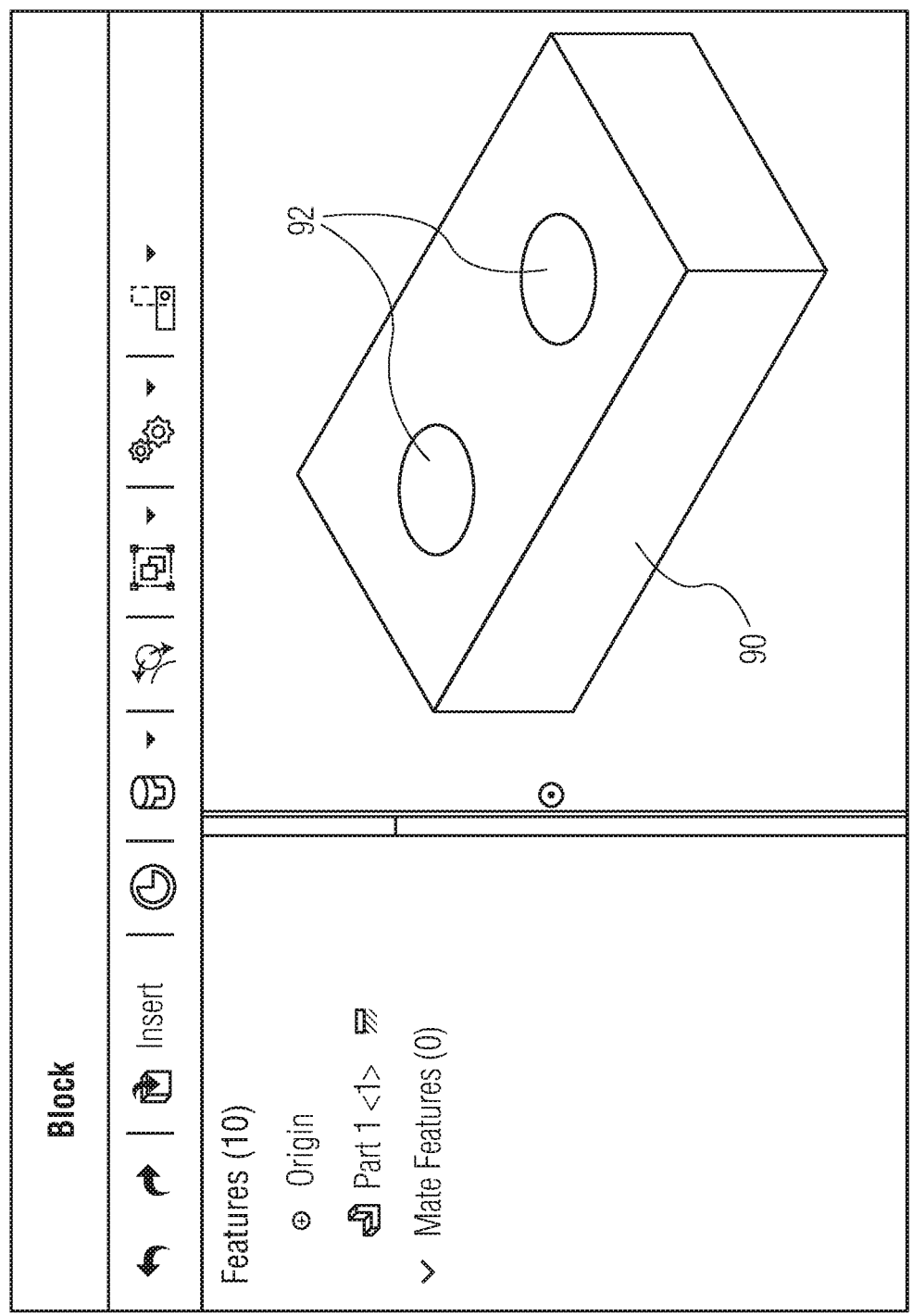
FIG. 9 shows the Onshape CAD program interface with a started assembly design.

Referring also to FIG. 9, when the same or another designer, such as CAD designer #2, starts another CAD design 90, smart properties of previously created components may be used. Features, for example holes 92 of a particular type, in this case simple through holes, may be added that relate to or can be used with previously created components having smart properties, such as the component model #1. The designer may specify the component that the particular feature is intended to be used by, and the component may include smart properties with sizing information for that component as it relates to the feature. This information may be used as criteria for automatic sizing when requested. Since all models are stored in the cloud infrastructure database, the required component model as authored by one CAD designer is readily available to all other CAD designers.

Figure 10:
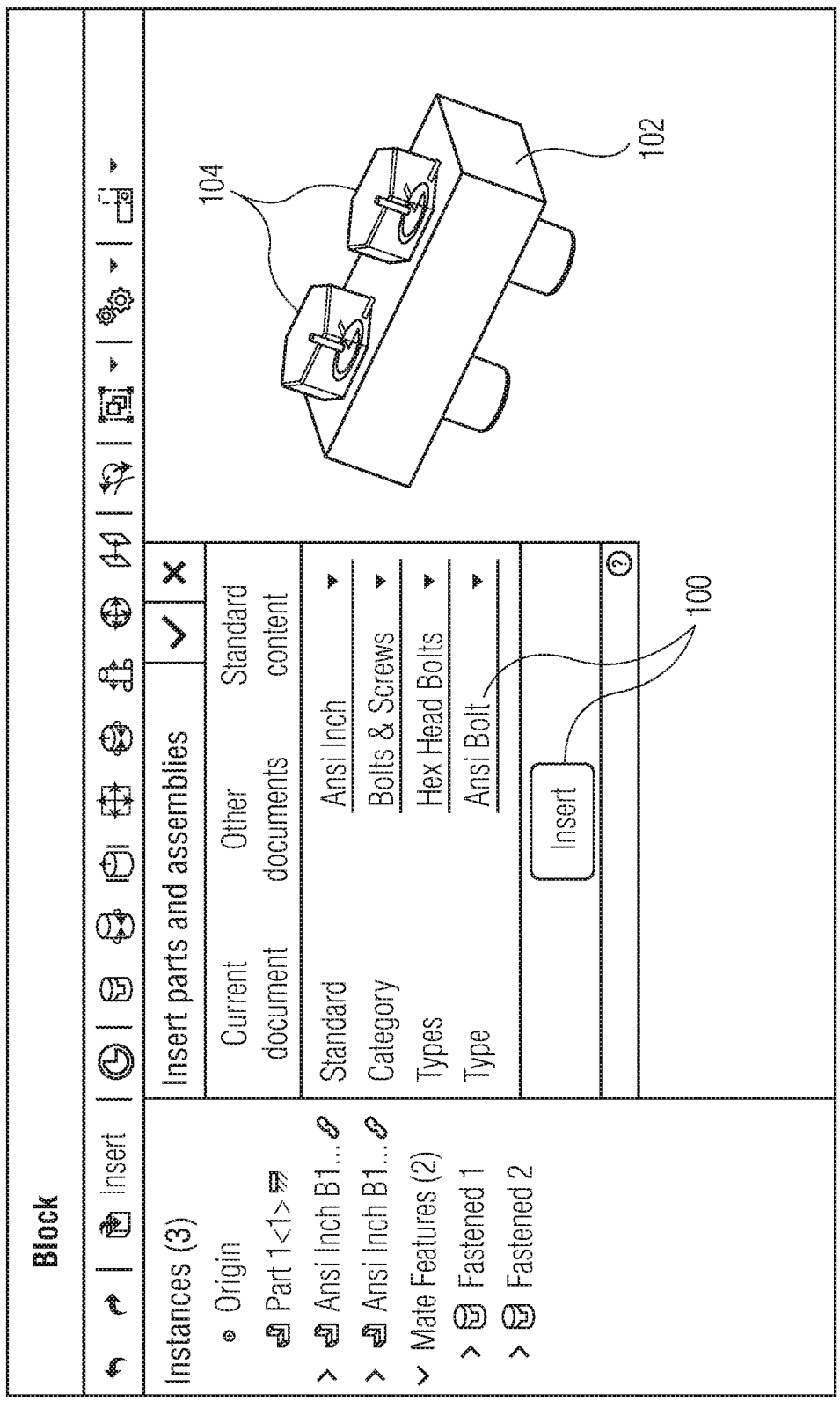
FIG. 10 shows, within the CAD program interface, the insertion of a component that is automatically sized and positioned into the assembly of FIG. 9.

Referring also to FIG. 10, a later design may insert previously designed components having smart properties. In the example shown, a CAD designer may select to include component model #1 100 into an assembly 102. The CAD design software may check the included component for smart properties. If a smart property configuration exists for a matching feature, the component sizes associated with that configuration may be automatically applied. If a smart connector exists and can connect with the feature, orientation based on the smart connector may be automatically applied. In the example shown, smart sizing automatically sizes component model #1 to the correct size that matches the feature and positions it in the correct position and orientation into the feature 104. In this case, the smart connector oriented model #1 into the through hole, the closest smart property diameter matched to the available diameter of the through hole, thereby defining which configuration ("size") of the model to use, and the other properties (head height and hex size) adjusted based on the configuration used. If smart properties or smart mate connectors exist which have been learned by the CAD system, they may similarly be applied when adding a component into an assembly.

In addition, on completion of the action, a smart analysis entry is created between component model #1 and the feature it is positioned into. A smart analysis record tracked by the CAD system links specific configurations of components with specific feature types. In the example, a smart analysis record is added to the CAD database and indicates that component model #1 has a relationship to a hole feature of a particular type used in the assembly. This information can be used in subsequent database queries to determine how component model #1 is being used and related to other CAD components and features in all designs.

Figure 11:
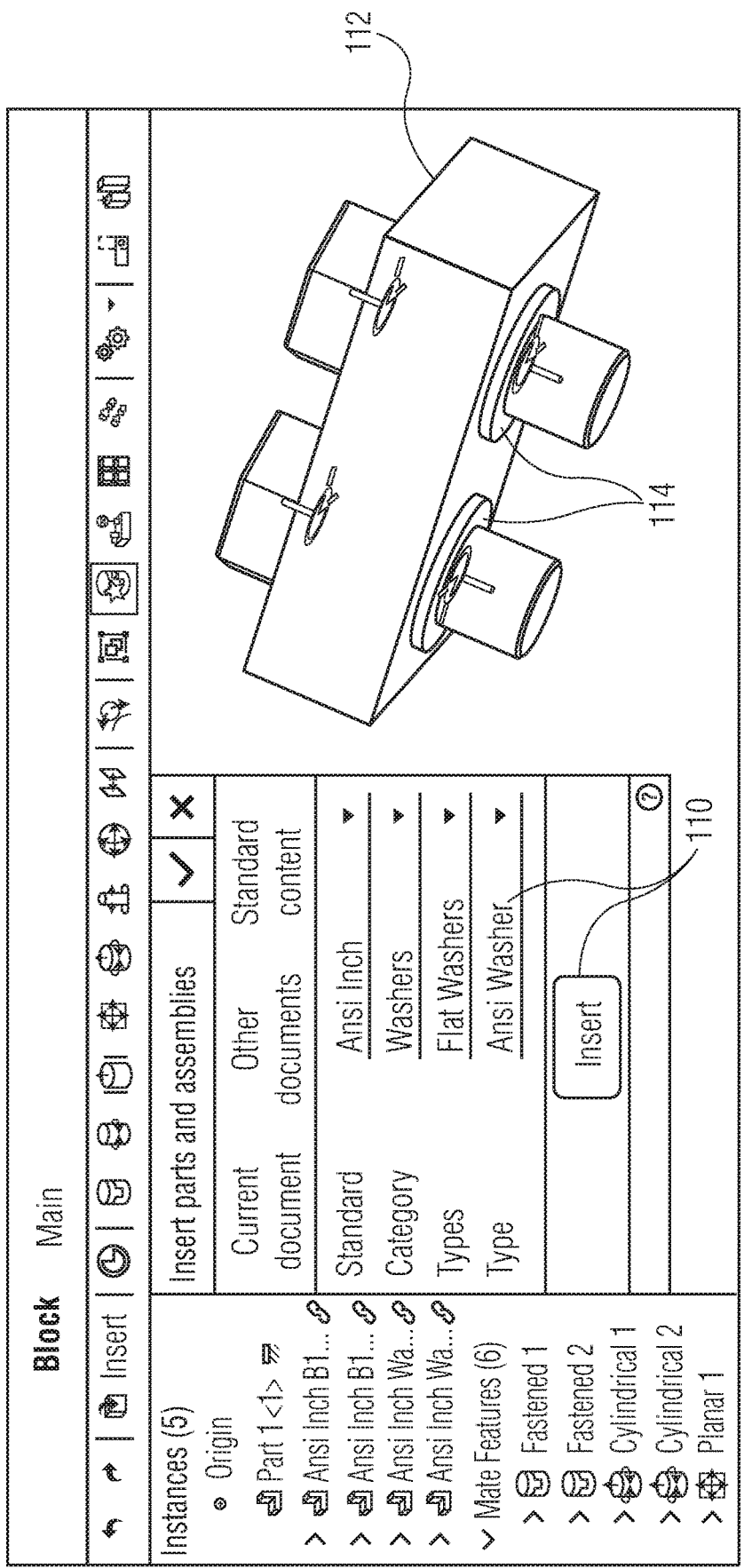
FIG. 11 shows, within the CAD program interface, the insertion of a second component that is automatically sized and positioned into the assembly of FIG. 10.

Additional components with smart properties and smart mate connectors may be added. Referring also to FIG. 11, continuing with the current example the CAD designer may also insert component model #2 110 into the assembly 112. If the added component has smart configurations matching a related component or feature, they may automatically be applied. Similarly, if a smart mate connector exists and matches, orientation and positioning may automatically be applied based on the smart connector. In addition, if a component has preconditions it will only be available for inserting into a design if the preconditions are met. In the illustrated example, component model #2 may have the "Ansi Bolt" precondition, and therefore only selectable for inserting into the design after an Ansi Bolt was inserted. Upon inserting model #2, the smart connector configured for component model #2 automatically orients and positions. Smart configuration may further automatically match configuration of component model #2 based on already inserted component #1, as both had smart properties defined for the same configurations. Dimensions for component model #2 adjust to those for the configuration matching the configuration of inserted model #1. Thus, smart configuration correctly sizes, positions, and orients the model into the feature 114.

Automatically learned smart relations may be applied in a similar manner. For example, if particular a bolt model and washer model are frequently used together, but no smart properties defined, these may be learned by the system. Once use thresholds are met, any learned relationships (for example, a same inner diameter of a washer frequently used with a specific diameter of a bolt, and washer thickness frequently used with that inner diameter) may be applied on inserting one model into a design already using the other model. As all designs are stored in the cloud-based system, in this fashion smart properties may be learned across multiple designs of multiple designers.

It is to be understood that the above description is intended to be illustrative, and not restrictive. Many other embodiments will be apparent to those of skill in the art upon reviewing the above description. The scope should, therefore, be determined with reference to the appended claims, along with the full scope of equivalents to which such claims are entitled.

What is claimed is:

1. A method of automatic part sizing, positioning, and orientation within a system for multi-user cloud-based computer aided design (CAD), comprising:

operating CAD user interface software within a browser or application on a computing device of a CAD model designer, wherein the CAD user interface software communicates with a cloud-based CAD modeling software program;

tracking, within a cloud-based database accessed by the cloud-based CAD modeling software program, wherein the one or more smart connectors are pre-configured mate connectors defining an orientation and positioning for the component, smart properties of a component wherein the smart properties specify individual parameters of different properties for multiple specific configurations of the component;

tracking, within the cloud-based database, one or more smart mate connectors of the component;

inserting the component into an assembly at an existing feature in the assembly;

matching the existing feature to a specific configuration of the component;

sizing the component by adjusting the properties of the component to match the individual parameters of the specific configuration;

matching the smart mate connector to the existing feature; and positioning and orienting the component based on the smart mate connector.

2. The method of claim 1, further comprising setting, within the CAD user interface software, individual parameters for each different property of each configuration by the CAD model designer.

3. The method of claim 2, further comprising:
configuring, within the CAD user interface software, pre-condition requirements for the component by the CAD model designer;
tracking the configured pre-condition requirements along with smart properties within the cloud-based database; and
presenting, by the CAD modeling software program, the component as available for insertion into other CAD model designs only when the configured pre-condition requirements are met within the other CAD model designs.

4. The method of claim 1, further comprising:
learning, by the CAD modeling software program, smart properties and smart mate connectors of the component based on use of the component by multiple CAD model designers.

5. The method of claim 4, wherein learning further comprises tracking, in the cloud-based database, all usage instances of the component, and basing smart property values and smart connectors on a number of times and percentage the component is used with specific parameter values and connected at a specific feature.

6. The method of claim 1, further comprising:
fitting the component into the assembly at an existing mate connector of the existing feature that matches the smart mate connector; and
orienting the component based on an orientation defined by the smart mate connector.

7. A system for multi-user cloud-based computer aided design (CAD) with automatic part sizing, positioning, and orientation, the system comprising:
a computing device of a CAD model designer, the computing device having a processor and non-transient media, the processor operating software stored in the non-transient media for a CAD user interface within a browser or application;
one or more cloud-based computer servers having processors and non-transient media, the processors operating software stored in the non-transient media for a cloud-based CAD modeling software program, wherein the cloud-based CAD modeling software program includes instructions for:
communicating with the CAD user interface and accessing a cloud-based database;
tracking, within the cloud-based database accessed, smart properties of a component being inserted into a model displayed within the CAD user interface, wherein the smart properties specify individual parameters of different properties for multiple specific configurations of the component;
tracking, within the cloud-based database, one or more smart mate connectors of the component, wherein the one or more smart connectors are pre-configured mate connectors defining an orientation and positioning for the component;
inserting the component into an assembly of the model at an existing feature in the assembly;
matching the existing feature to a specific configuration of the component;
sizing the component by adjusting the properties of the component to match the individual parameters of the specific configuration;
matching the smart mate connector to the existing feature;
positioning and orienting the component based on the smart mate connector; and
communicating the updated CAD model with sized, positioned, and oriented component to the CAD user interface for display on the computing device.

8. The system of claim 7, wherein the cloud-based CAD modeling software program further includes instructions to receive, from the CAD user interface software, individual parameters for each different property of each configuration set the CAD model designer.

9. The system of claim 8, wherein the cloud-based CAD modeling software program further includes instructions to:
receive, from the CAD user interface, pre-condition requirements for the component configured by the CAD model designer;
track the configured pre-condition requirements along with smart properties within the cloud-based database; and
communicate, to the CAD modeling software program, the component as available for insertion into other CAD model designs only when the configured pre-condition requirements are met within the other CAD model designs.

10. The system of claim 7, wherein the cloud-based CAD modeling software program further includes instructions to learn smart properties and smart mate connectors of the component based on use of the component by multiple CAD model designers.

11. The system of claim 10, wherein the cloud-based CAD modeling software program instructions to learn further comprises instructions to track, in the cloud-based database, all usage instances of the component, and base smart property values and smart connectors on a number of times and percentage the component is used with specific parameter values and connected at a specific feature.

12. The system of claim 7, wherein the cloud-based CAD modeling software program further includes instructions to:
fit the component into the assembly at an existing mate connector of the existing feature that matches the smart mate connector; and
orient the component based on an orientation defined by the smart mate connector.

13. A method of automatic part positioning and orientation within a system for computer aided design (CAD), comprising:
operating CAD user interface software on a computing device for CAD modeling;
inserting a component having one or more smart mate connectors into a CAD assembly within the CAD user interface, wherein the one or more smart connectors are pre-configured mate connectors defining an orientation and positioning for the component;
matching one of the smart mate connectors to an existing mate connector of an existing feature in an assembly;
automatically positioning the component into the assembly by fitting at the existing mate connector; and
automatically orienting the component based on the orientation defined by the matched smart mate connector.

14. The method of claim 13, further comprising learning smart mate connectors of the component based on use of the component by multiple CAD model designers.

15. The method of claim 14, wherein learning further comprises tracking, in a cloud-based database, all usage instances of the component, and basing smart connectors on a number of times and percentage the component is connected at a specific feature.

\* \* \* \* \*